(12) United States Patent
Basstein

(10) Patent No.: US 6,912,926 B2
(45) Date of Patent: Jul. 5, 2005

(54) GEAR TRANSMISSION

(75) Inventor: Augustinus F.H. Basstein, Prinsenbeek (NL)

(73) Assignee: ASS AG, Dudingen (CH)

( * ) Notice: Subject to any disclaimer, the term of this patent is extended or adjusted under 35 U.S.C. 154(b) by 2 days.

(21) Appl. No.: 09/992,509

(22) Filed: Nov. 6, 2001

(65) Prior Publication Data

US 2002/0124671 A1 Sep. 12, 2002

(30) Foreign Application Priority Data

Nov. 26, 2003 (NL) .............................. 1016550

(51) Int. Cl.⁷ ................................. F16H 1/12
(52) U.S. Cl. ......................... 74/416; 74/400
(58) Field of Search .................. 74/395, 410, 416, 74/665 F, 665 L, 438, 424, 406, 400

(56) References Cited

U.S. PATENT DOCUMENTS

| | | | | |
|---|---|---|---|---|
| 1,040,443 A | * | 10/1912 | Signor ........................ | 74/410 |
| 1,514,522 A | * | 11/1924 | Himes ........................ | 74/410 |
| 2,479,406 A | * | 8/1949 | Rapuano ...................... | 74/416 |
| 3,368,420 A | * | 2/1968 | Alexander .................... | 74/410 |
| 3,374,687 A | * | 3/1968 | Vogt .......................... | 74/417 |
| 3,727,574 A | * | 4/1973 | Bagge ......................... | 440/66 |
| 4,266,436 A | * | 5/1981 | Reppert ....................... | 74/395 |
| 4,297,907 A | * | 11/1981 | Bossler et al. ............... | 74/417 |
| 5,071,395 A | * | 12/1991 | Fahy et al. .................. | 475/226 |
| 5,233,886 A | * | 8/1993 | Bossler, Jr. ................. | 74/665 F |
| 6,041,670 A | * | 3/2000 | Basstein ...................... | 74/416 |
| 6,073,510 A | * | 6/2000 | Tomaselli ..................... | 74/416 |

\* cited by examiner

Primary Examiner—Chris Schwartz
(74) Attorney, Agent, or Firm—St. Onge Steward Johnston & Reens LLC

(57) ABSTRACT

The invention relates to a gear transmission comprising a first shaft, an intermediate shaft which is parallel to the first shaft, a first cylindrical pinion and a second cylindrical pinion for coupling the rotation of the first shaft and the intermediate shaft, a third cylindrical pinion which can rotate with the first shaft, and a fourth cylindrical pinion which can rotate with the intermediate shaft, and a double-toothed face gear mounted between and meshing with the third and fourth cylindrical pinions.

9 Claims, 2 Drawing Sheets

GEAR TRANSMISSION

BACKGROUND OF THE INVENTION

The invention relates to a gear transmission in accordance with the preamble of claim 1. A gear transmission of this type is known from U.S. Pat. No. 6,073,510, Tomaselli. The drawback of the known gear transmission is that the axial displacement of the double-toothed face gear does not take place in the vicinity of the location where the forces are exerted on the double face gear, and consequently elasticity and deformation of the various components will play a role. Consequently, the forces on the two sides of the double-toothed face gear are not always identical, and undesired vibrations may occur.

To avoid the above drawbacks, the gear transmission is designed in accordance with the defining part of claim 1. Consequently, the oppositely directed tooth forces acting on the double-toothed face gear have no influence on low loads and on structural parts other than the face gear, so that deformation and vibrations are avoided.

According to a refinement, the gear transmission is designed in accordance with claim 2. This leads to a double-toothed face gear which is simple to produce.

According to a refinement, the gear transmission is designed in accordance with claim 3. This leads to a simple and strong structure in which the structure which is driven by the double-toothed face gear and is mounted inside it can have a large diameter.

According to a refinement, the gear transmission is designed in accordance with claim 4. As a result, the force which is exerted on the coupling toothing at the location of meshing with the cylindrical pinions is not unacceptably high, and the double-toothed face gear is provided with sufficient guidance in the axial direction, so that axial displacement is always possible.

According to a refinement, the gear transmission is designed in accordance with claim 5. As a result, the forces exerted on each set of toothing of the double-toothed face gear are always of equal magnitude and oppositely directed, resulting in smooth running.

According to a refinement, the gear transmission is designed in accordance with claim 6. As a result, there will be little deformation in the double-toothed face gear resulting from tooth forces, resulting in smoother running.

According to a refinement, the gear transmission is designed in accordance with claim 7. As a result, when using helical toothing, the force exerted on the second shaft by the double-toothed face gear is minimal.

According to a refinement, the gear transmission is designed in accordance with claim 8. This makes it easier to fit the double-toothed face gear, since it can be turned between the fitted cylindrical pinion.

According to a refinement, the gear transmission is designed in accordance with claim 9. As a result, the forces exerted on the pinions are identical, while the tooth angle of the cylindrical pinions is matched to the pitch, if appropriate in accordance with the diameter of the cylindrical pinion.

According to a refinement, the gear transmission is designed a compact differential, in which case minimal forces are exerted on the housing by the toothing, so that the noise pollution is also minimal.

The invention is explained below with reference to a number of exemplary embodiments and with the aid of a number of figures, in which:

DETAILED DESCRIPTION OF THE DRAWINGS

Figure 1:
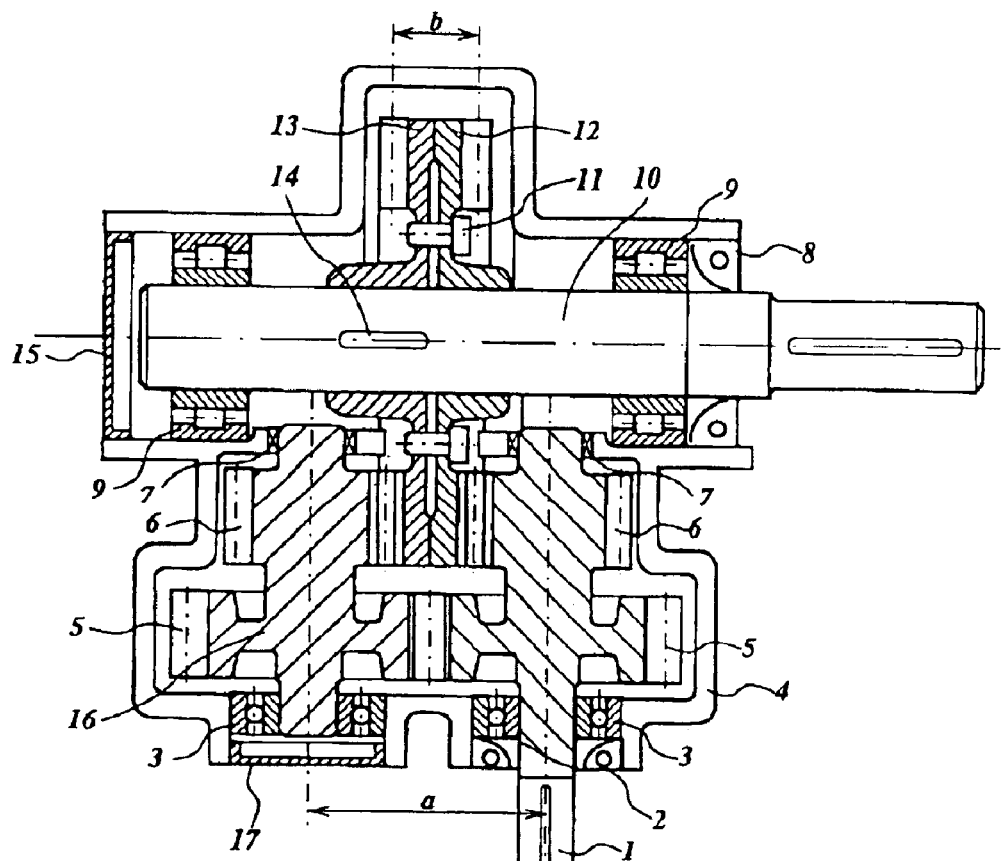
FIG. 1 shows a gear transmission in accordance with a first exemplary embodiment.

FIG. 1 shows a gear casing with an input shaft 1 and a face-gear shaft 10, the rotation of the input shaft 1 and the face-gear shaft 10 being coupled to one another by means of a gear transmission. The input shaft 1 is mounted in a housing 4 by means of a bearing 3 and a needle bearing 7. The face-gear shaft 10 is likewise mounted in the housing, by means of bearings 9. The axes of rotation of the input shaft 1 and the face-gear shafts 10 lie in one plane, and this plane is the parting plane of the housing 4, which comprises two identical halves. The two halves of the housing 4 are connected to one another, in a manner which is not shown. In the housing 4, an intermediate shaft 16 is mounted in a bearing 3 and a needle bearing 7, the axis of rotation likewise lying in the parting plane of the housing 4. To form a seal, the housing 4 is provided with a cover 17 at the location of the intermediate shaft 16. The input shaft 1 and the intermediate shaft 16 are parallel and have a constant center-to-center distance a.

The input shaft 1 is provided with a first pinion toothing 6, which meshes with a first face gear 12 which can rotate about the face-gear shaft 10. A second face gear 13, the toothing of which meshes with the first pinion toothing 6 of the intermediate shaft 16, is secured to the face-gear shaft 10. The two face gears 12 and 13 are positioned between the two first sets of pinion toothing 6. The rotation of the input shaft 1 and the intermediate shaft 16 are coupled via second sets of pinion toothing 5, which are likewise arranged on the input shaft 1 and the intermediate shaft 16, respectively. The diameter of the first pinion toothing 6 is smaller than the diameter of the second pinion toothing 5.

To form a seal, the housing is provided, at the location of the intermediate shaft 16, with a cover 17 and, at the location of the face-gear shaft 10, with a cover 15. The input shaft 1 and the intermediate shaft 16 have a constant center-to-center distance a.

The device operates as follows. The input shaft 1 and the intermediate shaft 16 have an identical speed of rotation, with the rotation taking place in opposite directions. This results from the second pinion toothing 5 of both shafts having the same number of teeth. The first pinion toothing 6 of both shafts also has the same number of teeth, as does the face-gear toothing of the first face gear 12 and the second face gear 13. A torque which is introduced to the gear casing via the input shaft 1 is transmitted, split via the second pinion toothing 5 and via the two pinion shafts 1 and 16, to the two face gears 12 and 13 and, from there, to the face-gear shaft 10. This split enables the torque transmitted by the gear transmission to be increased while maintaining the same diameter of face gear and therefore the same dimensions of the casing 4.

To ensure that the torque is transmitted to the face-gear shaft 10 via both face gears 12 and 13, it is necessary for the toothing of the face gears 12 and 13 to mesh with the first sets of pinion toothing 6 simultaneously. To enable this to occur, during assembly the face gears 12 and 13 can rotate with respect to one another, so that the tooth clearance can be eliminated. For this purpose, the second face gear 13 is secured by means of a keyway 14 to the face-gear shaft, and the first face gear 12 is secured to the second face gear 13 by means of coupling bolts 11. In the first face gear 12, the holes for the coupling bolts 11 are designed as slots, with the result that the first face gear 12 can rotate slightly with respect to the second face gear 13. During assembly of the pinions and face gears in the casing 4, the coupling bolts 11 are tightened securely after the first face gear 12 and the second face gear 13 have been adjusted with respect to the first sets of pinion toothing and second sets of pinion toothing 6, respectively. In this way, power is split, so that both face gears 12 and 13 can transmit the torque to the face-gear shaft 10. Correct selection of the tooth clearances between the respective first sets of pinion toothing 6 and the sets of face-gear toothing of the face gears 12 and 13, and the tooth clearance between the second sets of pinion toothing 5 enables the meshing to be optimally adapted for both directions of rotation, so that the torque is always passed fully over both face gears 12 and 13 to the face gear shaft 10.

In the exemplary embodiment illustrated, to adjust the face gears 12 and 13 use is made of the keyway 14 for coupling the second face gear 13 to the face-gear shaft 10 and of the coupling bolts 11 for coupling the first face gear 12 to the second face gear 13. If appropriate, other structures can also be used for this purpose, for example one or both of the face gears 12 and 13 may, in a known way, be secured to the face-gear shaft 10 by means of conical bushes.

In the embodiment shown, in which one of the face gears 12 or 13 is clamped to the face-gear shaft 10, it is necessary for the face-gear shaft 10 to be able to move in the longitudinal direction, so that both face gears 12 and 13 are subjected to equal loads. If appropriate, the face-gear shaft 10 may be mounted in the axial direction, and the face gears 12 and 13 can be slid along the face-gear shaft 10, for example over a key toothing.

In the design shown, in which the input shaft 1 and the intermediate shaft 16 are at a constant distance a from one another, it is important, in connection with the load-bearing capacity and correct adjustment of the toothing, for a distance b between the sets of toothing of the first gear 12 and the second face gear 13 to lie within set tolerances. This is achieved by accurate machining of the face gears 12 and 13. If appropriate, it is also possible for the distance a to be made variable, by making the bearings 3 and 7 of, for example, the intermediate shaft 16 displaceable in the plane passing through the input shaft 1 and the intermediate shaft 16.

Figure 2:
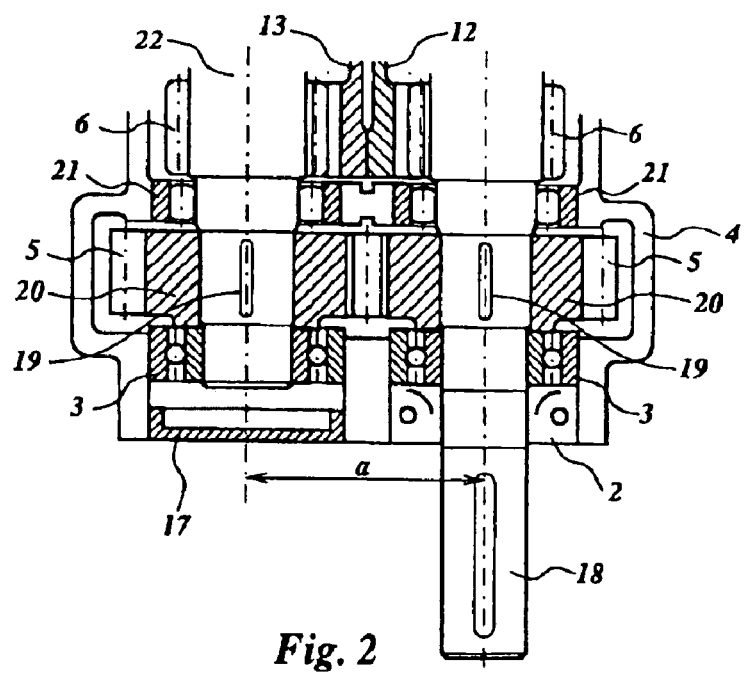
FIG. 2 shows a part of the gear casing from FIG. 1 in accordance with a second design, and FIG. 3 diagrammatically depicts a third exemplary embodiment of a gear transmission, as is used in the axle drive of a vehicle.

FIG. 2 shows a second exemplary embodiment of the gear transmission. In this embodiment, an input shaft 18 is provided with a first pinion toothing 6 and is mounted in a bearing 3 and a roller bearing 21. A second pinion toothing 5 is arranged on a pinion 20, which is attached to the input shaft 18. The roller bearing 21 supports the input shaft 18 between the first toothing 5 and the second toothing 6. The rotation of the pinion 20 is coupled to that of the input shaft 18, for example with the aid of a keyway 19. If appropriate, at least one of the pinions 20 is coupled to the input shaft or intermediate shaft by means of a removable conical clamping bush, so that the uniform load on the two face gears 12 and 13 which has been described above can be established easily and both face gears are attached to the face-gear shaft, for example by means of a key toothing.

In the exemplary embodiments described above, it is assumed that there are two face gears 12 and 13. However, it is also possible for the two sets of face-gear toothing to be arranged on either side of one component. In this case, it is necessary for the distance b between the sets of toothing to be made sufficiently accurate, unless the center-to-center distance a is adjustable. In this case, for correct adjustment, it is advantageous if one of the pinions, for example pinion 20, can be adjusted with respect to the shaft on which it is secured by means of a clamping bush described above.

The sets of toothing of the pinions and face gears may be designed as straight sets of teeth or as helical sets of teeth. In one embodiment, the first sets of pinion toothing 6 are helically toothed and are both left-hand or right-hand teeth with the same tooth inclination. Consequently, the tooth forces acting on the face gear, on account of the helical nature of the teeth, are oppositely directed, with the result that the load on the face-gear shaft 10 is minimal. The drawback that a face gear with helical toothing can be subjected to higher loads in one direction of rotation than in the other direction of rotation, on account of the tooth shape, can be overcome in this embodiment by the fact that a tooth flank which can be subjected to high loads is available in both directions of rotation. If the tooth clearances are selected appropriately, it is possible for the tooth flank which can be subjected to higher loads to be subjected to higher loads in both directions of rotation than the tooth flank which can be subjected to lower loads, so that the gear casing is able to transmit the same torque in both directions of rotation.

In one design, the toothing of the input shaft 1 or the intermediate shaft 16 is designed in such a manner that the pitch of the first pinion toothing 6 is identical to the pitch of the second pinion toothing 5, both sets of toothing being left-hand or right-hand. As a result, it is possible for this shaft to be displaced in the axial direction along the sets of toothing of the face gear and pinion with which they mesh, as a result of rotation. This is an advantage during assembly if, for example, the casing 4 is not split in the plane of the axes of rotation of the input shaft and the intermediate shaft.

In addition to the embodiment described above, it is possible, in a known way, for the direction of the tooth inclination to be selected in such a manner that the axial force acting on the pinion shafts more or less compensate for one another. This is the case, for example, if both first sets of pinion toothing 6 have the same direction of tooth inclination and the second pinion toothing 5 of the intermediate shaft 16 or 22 also has this direction.

In the embodiments which have been described, it is assumed that the sets of toothing 5 and 6 for the input shaft and the intermediate shaft are at the same rotational speed. It will be clear that it is also possible to select different numbers of teeth for these sets of toothing, in which case, if appropriate, the number of teeth of the face gears 12 and 13 can also be selected differently.

To ensure that the axial load on the shaft of the face gears is zero, it is important for the meshing between the two face gears 12 and 13 and the two first sets of pinion toothing 6 to be identical, so that the tooth forces acting on the two face gears 12 and 13 are always identical and the meshing always takes place at the same diameter. This is achieved by, inter alia, mounting and producing the two face gears 12 and 13 in such a manner that the tooth spaces and teeth of the face gears 12 and 13 are symmetrical with respect to a plane which lies centrally between the face gears. In this case, the tooth spaces of the two face gears are always at the same location, so that at that location there is a minimal thickness of material, which is more or less constant over the width of the teeth. For helically toothed face gears 12 and 13, this also means that one face gear interacts with a left-hand pinion and the other face gear interacts with a right-hand pinion. Consequently, the two lines of contact for the two face gears lie in a plane which is parallel to the axis of rotation, and the axial forces on the face gear are identical and oppositely directed.

Figure 3:
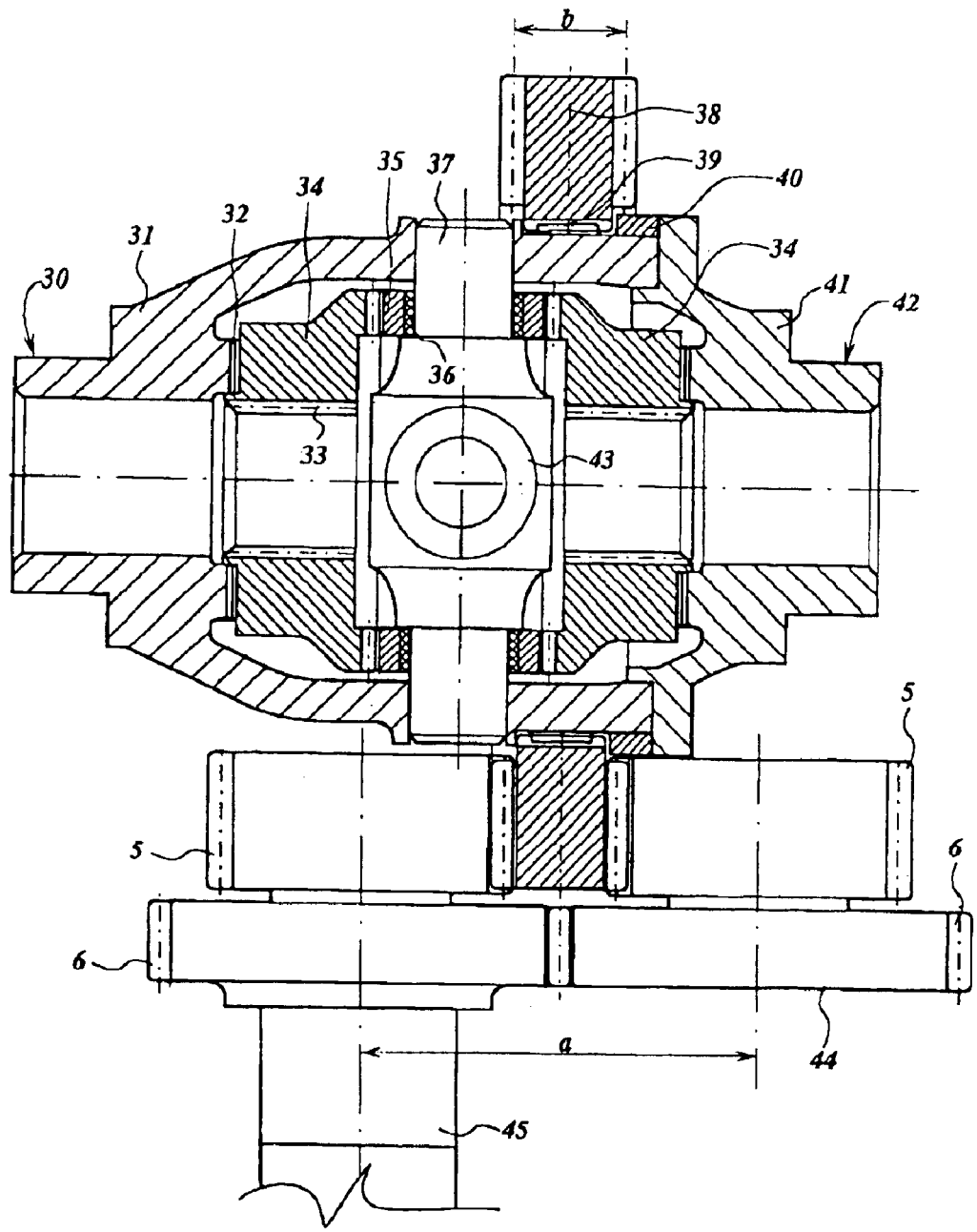

FIG. 3 shows an application of face-gear toothing for a differential. The differential comprises a differential housing 31, to which a differential cover 41 is secured using bolts in a known way. The differential housing 31 is provided with a bearing journal 30, and the differential cover 41 is provided with a bearing journal 42. During use, bearings are mounted on the bearing journal 30 and the bearing journal 42, by means of which bearings the differential is mounted rotatably in a housing.

A coupling toothing 39, which interacts with the corresponding coupling toothing 39 of a double-toothed face gear 38, is arranged on the outer periphery of the differential housing 31. The double-toothed face gear 38 can move in the axial direction along the coupling toothing 39, the axial movement being delimited by, firstly, the differential housing 31 and, secondly, a ring 40 which is fitted around the differential housing 31. The coupling toothing 39 runs parallel to the axis of rotation of the differential housing. The double-toothed face gear 38 is provided on both sides with face-gear toothing which is perpendicular to the direction of the coupling toothing 39. The two sets of face-gear toothing are at a distance b from one another. The distance b is such that the length of the coupling toothing 39 is sufficiently long and, for example, is of a similar length to the width of the face-gear toothing and is preferably at least greater than half the width of the face-gear toothing.

The sets of face-gear toothing of the double-toothed face gear 38 interact, in the manner described above, with the sets of toothing of the second pinions 5. These pinions form part of a pinion shaft 44 and a drive shaft 45, which are also provided with two first sets of pinion toothing 6, which mesh with one another. The pinion shaft 44 and the drive shaft 45 are mounted in a known way in the housing in which the differential is also mounted.

Two differential gears 34 are mounted in the differential housing 31. The two differential gears 34 are provided with face-gear toothing. The sets of face-gear toothing are mounted so that they face one another. Four differential pinions 35 are mounted between the sets of face-gear toothing, which pinions can each rotate, together with a pinion bearing 36, about a crosspiece pin 37. The crosspiece pins 37 are mounted in a crosspiece 43 and the differential housing 31. In the axial direction, the differential gears 34 are supported, by means of axial bearings 32, against the differential housing 31 and the differential cover 41. The differential gears 34 are provided on the inner side with sets of coupling toothing 33. Coupling shafts, which couple the rotation of the differential gears 34 to the rotation of the respective wheels of the vehicle, can be fitted into the sets of coupling toothing 33.

When mounting the differential, the drive shaft 45 and the pinion shaft 44 are fitted first. Then, the double-toothed face gear is fitted, and next the differential housing 31 is pushed into the coupling toothing of the double-toothed face gear 38.

Fitting the double-toothed face gear 38 is not a problem, since the cylindrical pinions 5 have straight teeth and a tooth angle which is identical but oppositely directed. In the latter case, however, a force is exerted on the double-toothed face gear 38, directed toward or away from the differential housing, with the result that a load is also applied to the bearing arrangement of the differential. To avoid the additional noise which this causes, when using helically toothed cylindrical pinions 5 the teeth angles are identically directed and, if appropriate, also identically sized. As a result, the tooth forces which occur at the double-toothed face gear 38 have no effect on the loads at the bearing journals 42, so that these tooth forces will cause little or no noise at those journals. To fit the double-toothed face gear 38, it is then necessary for the cylindrical pinions 5 to be able to rotate independently of one another during installation.

What is claimed is:

1. A gear transmission comprising: a first shaft, an intermediate shaft which is parallel to the first shaft, a first cylindrical pinion having a first set of teeth and which is mounted to rotate with the first shaft, a second cylindrical pinion having a second set of teeth and mounted to rotate with the intermediate shaft, the first and second sets of teeth of the first cylindrical pinion and the second cylindrical pinion having the same number of teeth and the same diameter and meshing with one another, a third cylindrical pinion which is mounted to rotate with the first shaft, a fourth cylindrical pinion which is mounted to rotate with the intermediate shaft, the sets of teeth of the third cylindrical pinion and the fourth cylindrical pinion having the same number of teeth and the same diameter, a double-toothed face gear having face gear teeth being mounted between and respectively meshing with the sets of teeth of the third cylindrical pinion and the fourth cylindrical pinion, the double-toothed face gear able mounted to rotate about a second shaft which forms an angle with the first shaft, wherein the double-toothed face gear is provided with coupling teeth for slideably coupling the rotation of the double-toothed face gear to the rotation of the second shaft, and the direction of the coupling teeth being perpendicular to a plane of the face gear, and the double toothed face gear being slideably mounted on a housing of a differential of a vehicle.

2. The gear transmission as claimed in claim 1, wherein the double-toothed face gear has the shape of a ring with face-gear teeth on sides thereof and with the coupling teeth on an internal diameter.

3. The gear transmission as claimed in claim 2, wherein the internal diameter of sets of face-gear teeth of the double-toothed face gear corresponds to an internal diameter of the ring.

4. The gear transmission as claimed in claim 2, wherein the ring has a thickness of at least four times the tooth height of one of the sets of teeth of the double-toothed face gear.

5. The gear transmission as claimed in claim 1, wherein the cylindrical pinions are helically toothed, and the first and second cylindrical pinions have the same direction as the third and fourth cylindrical pinions when mounted on the same shaft.

6. The gear transmission as claimed in claim 5, wherein pitches of cylindrical pinions mounted on the same shaft are identical.

7. The gear transmission as claimed in claim 1, wherein the third and fourth cylindrical pinions and the double-toothed face gear are helically toothed, and the third and fourth pinions are both either right-hand or left-hand pinions.

8. The gear transmission as claimed in claim 1 wherein the length of the coupling toothing is greater than half the width of the sets of face gear teeth of the double-toothed face gear.

9. The gear transmission as claimed in one of the preceding claims, characterized in that the sets of face gear teeth of the double-toothed face gear match one another, and spaces between the teeth and the teeth are symmetrical with respect to a plane which lies centrally between the sets of teeth of the face gear teeth.

* * * * *